Oct. 13, 1942.  V. F. GREAVES  2,298,369
LANTERN SLIDE CARRIER
Filed April 24, 1941   2 Sheets-Sheet 1
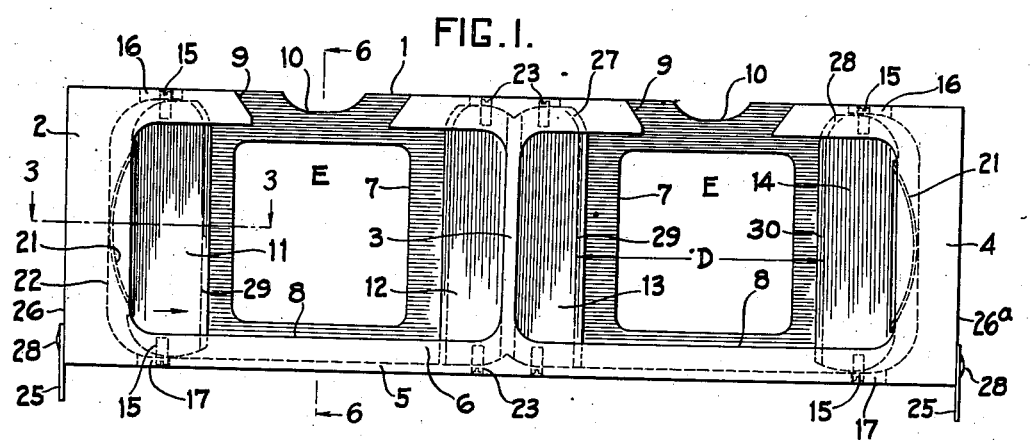
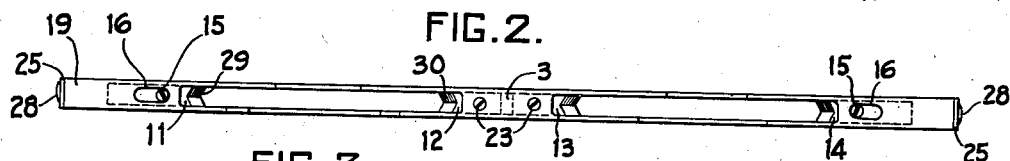
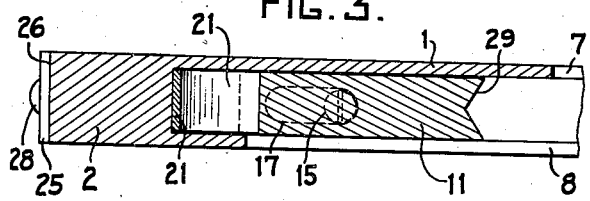
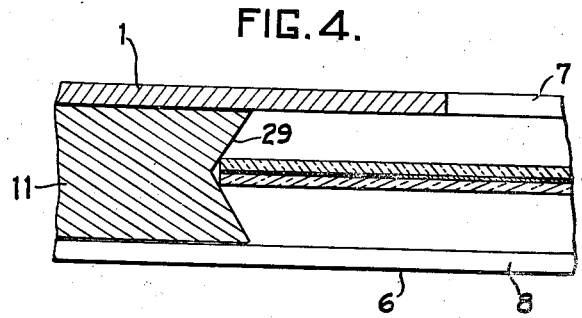
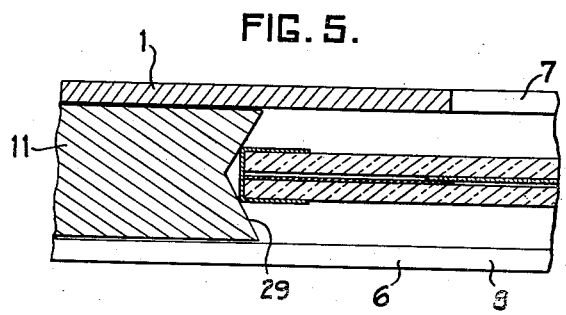
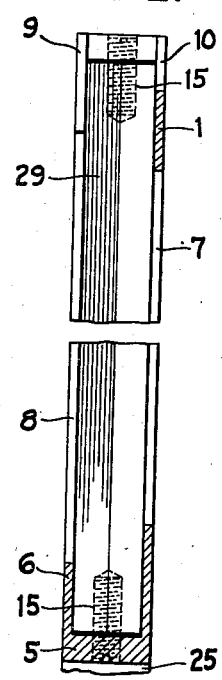
VALENTINE F. GREAVES
INVENTOR
BY
ATTORNEYS Oct. 13, 1942.　　　V. F. GREAVES　　　2,298,369
LANTERN SLIDE CARRIER
Filed April 24, 1941　　　2 Sheets-Sheet 2
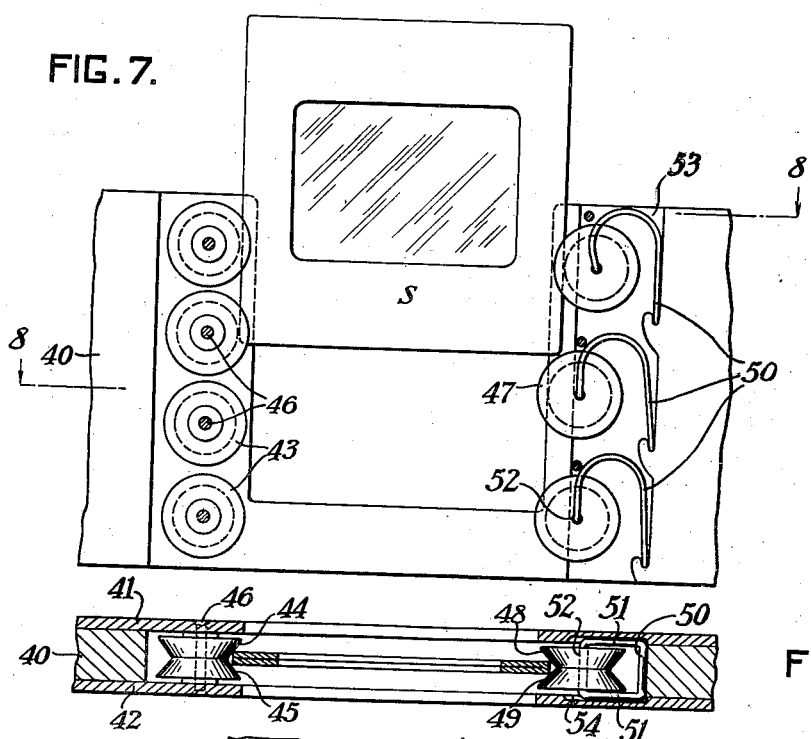
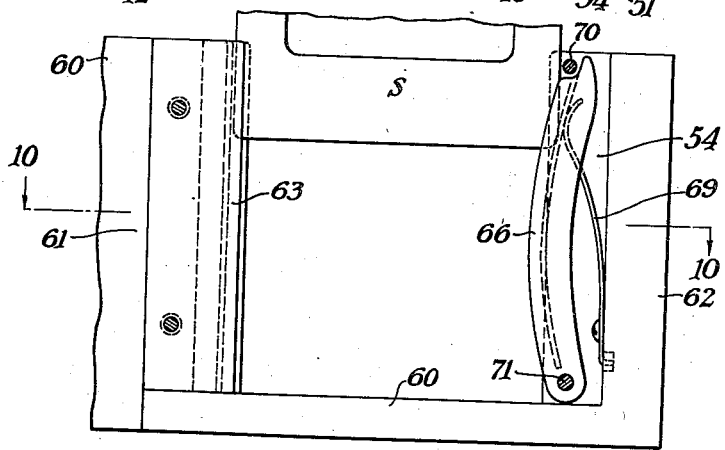
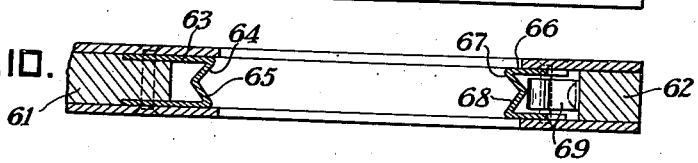
VALENTINE F. GREAVES
INVENTOR
BY
ATTORNEYS Patented Oct. 13, 1942

2,298,369

UNITED STATES PATENT OFFICE 2,298,369

LANTERN SLIDE CARRIER

Valentine F. Greaves, Oakland, Calif.

Application April 24, 1941, Serial No. 390,148

8 Claims. (Cl. 88—26)

This application relates to photography and more particularly to lantern slide holders for positioning lantern slides with respect to a projector. One object of my invention is to provide a lantern slide holder which will position lantern slides regardless of the thickness of the slide. Another object of my invention is to provide a lantern slide holder with a pair of opposed supporting guides so constructed that the slide may be centered midway between the edges of the guides. Another object of my invention is to provide a slide holder which is simple to make, inexpensive, and which requires practically no attention from the user even through the slide holder is operated in a darkened room suitable for projection purposes.

In the projectors which are commonly used for projecting pictures from lantern slides upon a screen it is customary to provide a slidable holder having two sections, one of which can be loaded and unloaded while the other of which holds a slide in a projection position. Such holders should be able to readily position slides of different thicknesses because these slides may vary considerably in thickness because of the way the picture carrying elements are mounted.

The simplest form of lantern slide may consist of a paper or cardboard mount with a frame positioning a picture carrying element for projection and in some instances the picture carrying element may consist only of a sheet of cellulosic material with an image on one side. Such elements are usually varnished to make the picture carrying element more durable. A second type of slide and a somewhat thicker one may be made by attaching a cellulosic picture carrying element directly to one sheet of glass and this glass sheet may or may not be supported by metal frames which, when used, add to the thickness of the slide. A still thicker type of slide is made by sandwiching the film carrying element between two sheets of glass and binding these together with a suitable metallic edging or tape. In addition to these more or less standard types of latern slides, others will be found utilizing nesting frame elements or metallic frame elements fastened together in various manners.

It is obviously desirable to provide a lantern slide holder with a means for supporting any of the above-mentioned types of latern slides which of course differ quite widely in thickness. I have provided a holder which will overcome the usual objections and this holder will be hereinafter more fully described.

Coming now to the drawings wherein like reference characters denote like parts throughout, Fig. 1 is a side elevation of a lantern slide holder constructed in accordance with and embodying a preferred form of my invention;

Fig. 2 is a top plan view of the holder shown in Fig. 1;

Fig. 3 is an enlarged fragmentary section taken on line 3—3 of Fig. 1;

Fig. 4 and Fig. 5 are both enlarged fragmentary sectional views showing the relationship of slides of different thickness to one of the guide rails of the lantern slide holder;

Fig. 6 is an enlarged sectional view taken on line 6—6 of Fig. 1;

Fig. 7 is a side elevation of a holder constructed in accordance with a second embodiment of my invention;

Fig. 8 is a section taken on line 8—8 of Fig. 7;

Fig. 9 is a side elevation of a holder illustrating a third embodiment of my invention; and Fig. 10 is a section taken on line 10—10 of Fig. 9.

Briefly, my invention comprises providing a pair of guides including grooves V-shaped in cross section, the angle of the grooves being selected to engage the opposite edgs of slides placed between the guides to firmly hold the slides centered in a projection position.

These guides may be in the form of straight rails, although preferably I prefer to round the upper edges to facilitate entering a slide, or they may be curved throughout their length so that only one portion of the V-shaped groove will be engaged on one side of the slide or they may be in the form of a plurality of rollers, in which case of course only the edges of the slide will have point contact with the V-shaped grooves in the peripheries of the rollers. Any combination of these differently shaped guides may be used.

It is of course possible to provide a slide holder with only a single frame or aperture but, since the double type of slide holders are in more common use, a double slide will be described as the preferred embodiment of my invention.

Referrring to Fig. 1, the lantern slide holder may comprise a base plate 1 which carries spaced arms 2, 3, and 4 and which is folded over to form a bottom wall 5 and which is again folded over to form a front wall 6. The base plate is provided with a pair of spaced frame members 7 through which a light beam may pass and the front of the slide holder, which is made from the folded plate 6, is provided with still larger frames 8 which, for convenience in handling, may be provided with a cut away area 9 adjacent the cutout 10 in the base plate which form together a finger opening to facilitate handling the slides.

The spaced arms are preferably provided with guides here shown as 11, 12, 13 and 14. The guides 11 and 14 are similar in that each of these, as shown in Fig. 3, consists of a metal plate movably mounted between the base plate 1 and the front plate 6 so that they may slide a limited distance therebetween. This sliding movement may take place because of screws or pins 15 attached to the guide 11 so as to extend through slots 16 and 17 in the top rail 19 and in the bottom rail 5 of the slide holder. A spring 21 lying in a recess between the wall 22 and the guide 11 serves to thrust the guide 11 in the direction shown by the arrow in Fig. 1 until one or both screws 15 strike the end of the slots 16 or 17.

The guides 12 and 13, if desired, can be fixedly mounted between the base plate 10 and the front plate 2 and in this instance the screws 23 may pass directly through the top rail 19 or the bottom rail 5 and may be without sliding movement. If desired, however, the guides 12 and 13 can be mounted in exactly the same way as the guides 11 and 14, since guide 14 is mounted similarly to guide 11.

I prefer to provide the stop arms 25 on the ends 26 and 26a of the holder, these stop arms being preferably pivoted by means of studs 28. These are of a known type and permit the desired amount of sliding movement of the lantern slide holder relative to the projector.

In use the lantern slide holder is extremely simple, since when one side of the holder is to be loaded it is only necessary to move a lantern slide downwardly through the curved portions 27 and 28 of the grooves 29 and 30 V-shaped in cross section carried by the guides 13 and 14. Since the lantern slide has a width somewhat greater than the distance D between a pair of guides 13 and 14 the spring member 21 may be slightly compressed as the lantern slide is entered, movement of the guide 14 being permitted through the screws 15 which pass into the slots 16 and 17 in the carrier. Thus, as the lantern slide is moved downwardly between the guides, the V-shaped grooves will center the slides in the center of the holder as indicated in Figs. 4 and 5 regardless of the thickness of the slide. The greater the thickness of the slide, the more the rails will be separated and the greater will be the compression of the spring 21. This spring, however, is preferably a leaf spring as indicated in Fig. 3 so that it may flex quite readily and so that a slide may be easily entered into the holder.

As a second embodiment of my invention there is shown in Figs. 7 and 8 a slide holder in which the guides are curved and are preferably made in the form of rollers with V-shaped grooves for receiving the edges of a slide. The holder may consist of a frame 40 having front and back walls 41 and 42 between which a plurality of rollers 43 may be mounted, each roller being provided with opposed walls 44 and 45 V-shaped in cross section. I prefer to mount one set of rollers 43 on fixed trunnions 46. On the opposite side of the frame members 41 and 42, I may provide a second set of curved guides in the form of rollers 47 which are also equipped with walls 48 and 49 which intersect to form V-shaped grooves. These rollers may be spring mounted on U-shaped spring members 50 which support, on the arms 51, trunnions 52 carrying the rollers, the side plates 41 and 42 being grooved at 53 and 54 so as to limit the movement of the rollers 47 under the impulse of their spring supports. Thus, the spring supports tend to move the rollers 47 toward the rollers 43 and when a slide S is inserted in the holder it will be centered by the V-shaped curved guides.

In the form of my invention shown in Figs. 7 and 8, I have shown four fixed rollers and three spring mounted rollers, although it is possible to employ any desired number of rollers in the complete support. I have found that two fixed and one movable roller work satisfactorily, but it is somewhat easier to enter a slide into a holder which is provided with a series of rollers as it is easier to move the slide vertically into a projection position.

Another form of my invention is shown in Figs. 9 and 10 wherein the slide holder may be a U-shaped member designated broadly as 60 having upstanding arms 61 and 62 on the two sides of the holder. The upstanding arm 61 may be provided with a straight guide 63 having a pair of opposed slide guiding face walls 64 and 65 which, as shown in Fig. 10, are substantially V-shaped in cross section.

The upstanding arm 62 may be provided with a curved elongated guide 66 also having a slot formed by the two walls 67 and 68 so as to be V-shaped in cross section. The curved guide 66 may be hollow so that a leaf spring 69 may tend to turn it against a stop pin 70 toward the fixed rail 63. The rail 66 is preferably pivoted at 71 to the frame member 62 so that when a slide S is moved into a projecting position, one side of the slide will engage the straight guide 63 and the other side of the slide will engage a portion of the curved guide 66 which thrusts the slide toward the fixed rail.

With all of the embodiments described above, the holders include a means for centering slides of different thicknesses by means of straight or curved guides which have a slot V-shaped in cross section. It is obvious that various arrangements of these guide rails can be made without departing from my invention as defined in the following claims.

I claim:

1. A lantern slide carrier comprising a base plate, spaced arms carried by the base plate, guides on which a lantern slide may move, each guide including two angularly disposed intersecting slide locating walls forming a V-shaped groove to receive the lantern slide, a movable mount for at least one guide including means for limiting the movement of said guide relatively to said support, and a spring tending to thrust said guide towards the opposite guide whereby a lantern slide may be frictionally held between the two guides.

2. A lantern slide carrier comprising a base plate, spaced arms carried by the base plate, guides on which a lantern slide may move, each guide including two angularly disposed intersecting slide locating walls forming a V-shaped groove to receive the lantern slide, a movable mount for at least one guide including a tongue and groove connection between the guide and support, a pin and slot for limiting possible movement of the guide to a predetermined amount, and a spring inside of the groove and engaging the tongue and groove for normally thrusting the guide from the support and into a lantern slide engaging position.

3. A holder for a picture carrying element including, in combination, a base plate having spaced arms with an opening therebetween, supporting guides for said picture carrying element comprising intersecting and angularly disposed walls forming a groove V-shaped in cross section to support an edge of a slide, at least one supporting guide including a movable connection with the base plate, and a spring for normally moving said guide from the base plate toward the other of said guides to frictionally engage a lantern slide therebetween.

4. A lantern slide holder comprising a pair of frames spaced a distance greater than the thickness of a lantern slide to receive a lantern slide therebetween, a pair of lantern slide engaging guides spaced apart one on each side of said frames, one guide of each pair of guides including a movable mount between the frames on which one guide may move, each guide having two facing angularly disposed walls forming grooves adapted to receive and engage the edges of lantern slides of different thicknesses, means for normally moving the movably mounted guide of each pair of guides toward the opposite guide to hold a lantern slide between the four angularly disposed walls on the two guides to position a lantern slide for projection.

5. A lantern slide holder comprising spaced front and back walls, each wall including pairs of frame members spaced apart to form two openings through which light may pass, top, bottom and end walls connecting the front and back walls, each frame member including a means for positioning a lantern slide including a pair of oppositely disposed guide members including V-shaped grooves facing each other, a movable mount for at least one guide, a spring normally thrusting one guide toward the other, the guides being mounted between the front and back wall members, one on each side of the opening through which light may pass whereby a lantern slide located by the guides may be in position for light passing through said opening and through said slide.

6. A lantern slide holder comprising a frame member through which light rays may pass, guide means on each side of the frame for supporting lantern slides of different thicknesses and centering said slides with respect to the lantern slide holder and comprising guide members having opposed walls forming a V-shape slot in cross section for engaging opposite edges of a flat lantern slide, at least one of said guide members being curved, and at least one of said guide members being mounted for limited movement to and from the other member of said members, and a spring for normally moving the movably mounted guide member toward the fixedly mounted member.

7. A lantern slide holder comprising a frame member through which light rays may pass, guide means on each side of the frame for supporting lantern slides of different thicknesses and centering said slides with respect to the lantern slide holder and comprising members having curved guides each comprising two walls angularly disposed to form a groove V-shaped in cross section, ae least a portion of which may engage an edge of a flat lantern slide, at least one of said curved guide members being provided on each side of the frame, a movable mount carrying the curved guide member on one side of the frame, and a spring tending to move the said guide member on the movable mount and toward the member on the opposite side of the frame.

8. A lantern slide holder comprising a frame member through which light rays may pass, guide means on each side of the frame for supporting lantern slides of different thicknesses and centering said slides with respect to the lantern slide holder and comprising members having curved guides in the form of rollers each comprising two walls angularly disposed to form a groove V-shaped in cross section, at least a portion of which may engage an edge of a flat lantern slide, at least one of said curved guide members being provided on each side of the frame, a movable mount carrying the curved guide member on one side of the frame, and a spring tending to move the said guide member on the movable mount and toward the member on the opposite side of the frame whereby a slide may be positioned by and centered between said rollers.

VALENTINE F. GREAVES.